Figure 1:
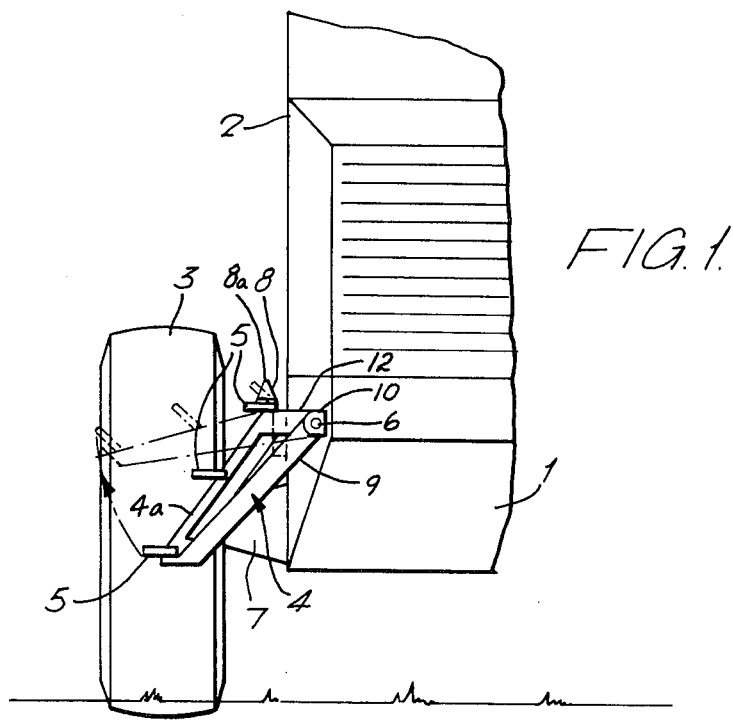

United States Patent [19]

Korhonen

[11] 4,078,831
[45] Mar. 14, 1978

[54] REJECTER FOR A LUMBERING MACHINE

[75] Inventor: Aarne Korhonen, Kulju, Finland

[73] Assignee: Rauma-Repola Oy, Finland

[21] Appl. No.: 694,831

[22] Filed: Jun. 10, 1976

[30] Foreign Application Priority Data

Jun. 26, 1975 Finland .................................. 751902

[51] Int. Cl.² ........................................... B60R 27/00
[52] U.S. Cl. .................................................... 280/770
[58] Field of Search ......................... 280/770, 760, 762

[56] References Cited

U.S. PATENT DOCUMENTS

| 1,596,537 | 8/1926 | Hintz | 280/770 |
| 2,732,637 | 1/1956 | Shadelen | 280/760 |
| 2,906,359 | 9/1959 | Wagner | 280/770 |

FOREIGN PATENT DOCUMENTS 1,570,637  6/1969  France .................................. 280/770

Primary Examiner—Robert R. Song
Attorney, Agent, or Firm—Burns, Doane, Swecker & Mathis

[57] ABSTRACT

A wedge-shaped deflector for small trees and brush, pivotally mounted on the side of the chassis of a lumbering machine ahead of the front wheels pivots freely about a horizontal axis which is substantially parallel to the longitudinal axis of the machine. In its normal, downward position, the deflector presents a surface upon which steps are secured to provide access to the cab. Another surface, slanting downward and outward away from the side of the chassis engages solid and immovable obstacles along the path of the machine and causes the deflector to pivot upward, thereby avoiding breakage. Upper and lower stop means limit the arc through which the deflector can pivot.

4 Claims, 4 Drawing Figures

REJECTER FOR A LUMBERING MACHINE

The subject of the present invention is a wedge-shaped or plough-shaped deflector of small trees, i.e. a "rejecter", placed on the side of a lumbering machine in front of the wheel.

In lumbering machines, a plough-shaped component is usually mounted rigidly to the chassis of the machine in front of the wheels, for the purpose of pushing aside or deflecting underbrush and small trees. As a rule, no lumbering machines having rubber tires are constructed without such deflector or so-called rejector.

A constructional detail that frequently causes difficulties in the manufacture of lumbering machines is the stairs up which the driver can safely ascend to the cabin these stairs frequently interfere with underbrush and, in particular, with even the smallest obstacles on the ground with stumps of trees. A common solution has been to construct stairs that can be raised while the machine is being driven. However, the stairs either fall down or the operator forgets to raise them altogether and they are broken immediately, even in normal forest terrain, as soon as the machine is put in motion.

In the construction in accordance with the present invention, these two important details are combined. The rejecter is pivotably mounted to the chassis of the machine in front of the wheel to be pivotable about an axis substantially parallel to the longitudinal axis of the machine. In its normal position, the rejector hangs down against a limiter on the chassis.

The present rejecter is mainly characterized in that the surface facing upwards is provided with steps for ascending to and descending from the lumbering machine. Because the rejecter is mounted to the chassis of the machine to be pivotable vertically about an axis positioned substantially in the longitudinal direction of the machine and has an edge which slants downward and toward the side of the rejecter, the latter, when in the free position, slants downward against stop means 7 to limit the down position and the above-mentioned steps assume a suitable position for ascending to and descending from the machine. Furthermore, because of the downward slanting edge, the rejecter, when meeting an obstacle on the ground, can pivot upward until a second stop means limits its uppermost position.

Figure 3:
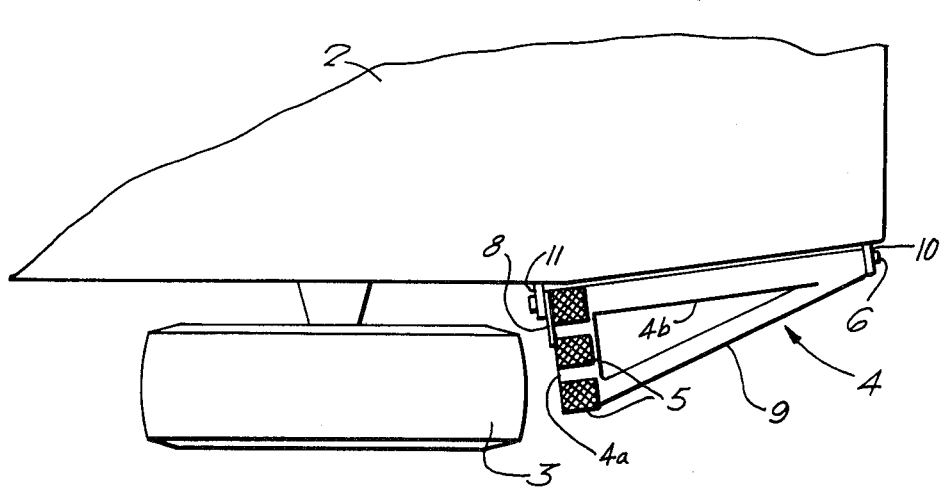
Figure 2:
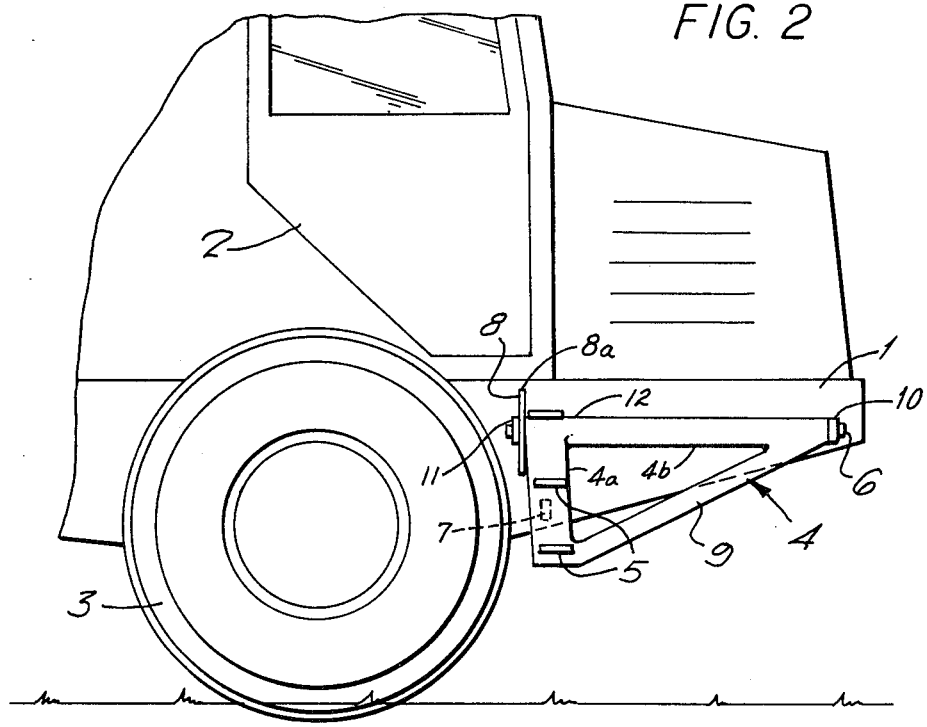
Figure 4:
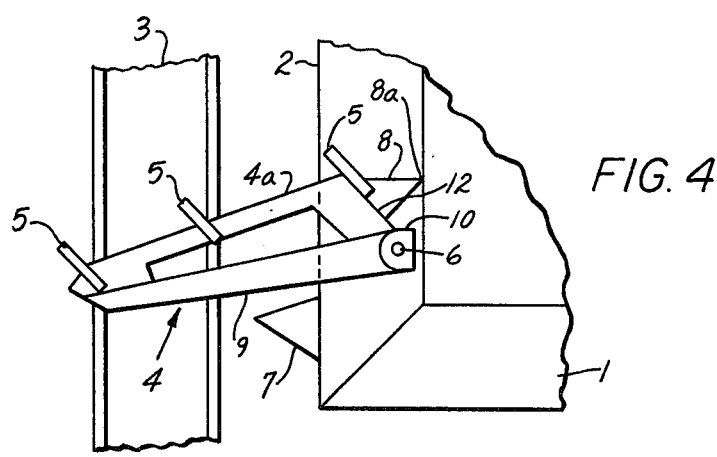

The invention will be more readily understood from the following detailed description and from the accompanying drawings, wherein FIG. 1 shows the right front corner of the lumbering machine as viewed from the front, FIG. 2 shows the subject of FIG. 1 as viewed from the side, FIG. 3 shows the subject of FIGS. 1 and 2 as viewed from above, and FIG. 4 is a view, similar to FIG. 1, showing the deflector in the raised position.

The driver's cabin 2 is placed on the chassis 1 of the lumbering machine. As is shown by the three Figures, a wedge-shaped or plough-shaped deflector of small trees or so-called rejecter 4, is fastened on the side of the chassis 1 of the lumbering machine in front of front wheel 3. The plough-shaped rejecter 4 is mounted to the chassis 1 of the machine to be pivotable vertically on bearings 10 and 11 about pivot axis 6 oriented substantially in the longitudinal direction of the machine. As can be seen from FIG. 1, the lowermost position of rejecter 4 is determined by lower stop means or limiter 7, mounted on chassis 2. In that position, the step-bearing member 4a rests against stop 7 which, as seen from FIG. 4 can be any suitable protrusion from the side of the chassis. The uppermost position, as seen from FIG. 4, is determined by upper stop means or limiter 8. Referring to FIGS. 1 and 4, it will be seen that upper stop means 8 is a triangular member having a point 8a. In the uppermost position shown in FIG. 4, the limit of upward rotation is reached when point 8a strikes chassis 2. Normally, rejecter 4 hangs down, suitably resting against lower limiter 7, and consequently, is in the position shown by solid lines in FIGS. 1 to 3, i.e., in the so-called free position. Steps 5 are fastened to the top surface of rejecter 4 for the purpose of ascending to and descending from cabin 2. As will be apparent from inspection of FIGS. 1-3, the deflector or rejecter comprises a plurality of elongated members to form a generally wedge-shaped framework. Thus, a first member 4b, which is seen to include the pivot axis 6, is attached to a second elongated member. The latter has a first portion 12, which is seen to extend generally perpendicular to the first elongated member 4b, and a second portion 4a which extends obliquely downward from the first portion 12. It is on this portion 4a that steps 5 are mounted. The third elongated member 9 of the wedge-shaped framework 4 connects the remote ends of members 4a and 4b. As a result of the illustrated configuration of members 4a and 4b. As a result of the illustrated configuration of members 4a and 4b, member 9 has a leading edge that slants downward and outward away from the side of the chassis.

The free position of rejecter 4 is such that the steps 5 are exactly located to be in a suitable position for ascending to and descending from the machine. However, should the rejecter 4, while the machine is in motion, meet a sufficiently high and robust obstacle, it will pivot upward because its front edge 9 slants to the side and downward, coming to rest together with steps 5, against upper limiter 8, to the position shown in FIG. 1 by broken lines. This position corresponds to the position which had to be normally maintained by the rigid rejecter of the prior art. In constructing the embodiment in accordance with the present invention, the rejecter 4 and the connected steps 5 can be made so robust that they are able to withstand any stresses that might possibly be encountered, because it is no longer necessary to raise or lower the stairs by human power.

What we claim is:

1. In combination with a lumbering machine, a deflector for clearing a path through small trees and brush comprising:
    (a) a plurality of elongated members rigidly connected to form a generally wedge-shaped framework;
    (b) means on a first set of said elongated members for rotatably mounting said framework on a lateral side of the chassis of the lumbering machine ahead of the front wheels of said lumbering machine said means defining a generally horizontal pivot axis substantially parallel to the longitudinal axis of the lumbering machine, said first elongated member extending substantially parallel to the chassis of the lumbering machine;
    (c) uppr and lower stop means cooperating with the deflector for defining the limts of upward and downward rotation of said deflector, said deflector being freely rotatable and assuming a normally downward position;

(d) a second of said elongated members of said deflector being attached to a rear end portion of the first elongated member so as to extend therefrom in a direction generally transverse and downwardly inclined to the longitudinal axis of the lumbering machine when in a normal position; and (3) a third of said elongated members connecting the forward end of the first elongated member and the free end of the second elongated member to provide said wedge-shaped framework with a downwardly and rearwardly inclined leading edge for engaging obstacles in the path of travel of the lumbering machine, the inclination of said leading edge causing the deflector to rotate upward about its pivot axis and to be raised from its normal down position to above said obstacle to prevent breakage.

2. The combination defined in claim 1 wherein steps are secured to said second elongated member and the lower stop means is mounted on the chassis in a position to cause said deflector to assume a position suitable for ascending to and descending from the lumbering machine.

3. The combination defined in claim 1 wherein the upper stop means comprises a rigid, protruding member secured to the second elongated member near the point of attachment of said first and second elongated members.

4. A deflector for clearing a path through small trees and brush for a moving lumbering machine comprising a plurality of rigid elongated members joined to form a generally wedge-shaped framework, a first of said elongated members having means attached thereto for pivotably mounting said framework to the chassis of a lumbering machine; a second elongated member secured proximate a rear end portion of said first elongated member, said second elongated member comprising a first portion extending generally perpendicular to said first elongated member and a second portion extending obliquely from said first portion; and a third elongated member connected to the forward end of said first elongated member and the free end of the second elongated member, thereby providing said deflector with a side having a leading edge sloping rearward and downward from its point of attachment to said first and second elongated members, respectively.

* * * * *